United States Patent Office 3,541,371
Patented Nov. 17, 1970

3,541,371
LIQUID ANODE FOR A GAS LASER
Jacques Legros, Massy, and Eugène Henri, Villiers-sur-Orge, France, assignors to Compagnie Generale d'Electricite, Paris, France, a corporation of France
Filed Nov. 26, 1968, Ser. No. 779,023
Claims priority, application France, Nov. 30, 1967, 130,484; Mar. 21, 1968, 144,809; Apr. 3, 1968, 146,907
Int. Cl. H01j 7/26, 19/36; H01s 3/04
U.S. Cl. 313—32                    10 Claims

ABSTRACT OF THE DISCLOSURE

An anode for a gas tube consists essentially of an annular base which supports an annular active anode part by means of two tubes. The active part is hollow and the base incorporates passages connected respectively by the two tubes to the interior of the active part. Furthermore connections are provided on the base for connecting the two passages to a coolant circulatory supply whereby coolant may be circulated through the system formed by the passages, the tubes and the active anode part interior.

BACKGROUND OF THE INVENTION

Field of the invention

The present invention relates to electrodes for gas tubes and more particularly to the provision of an improved anode whereby a coolant may be circulated through the anode structure.

Description of the prior art

Gas lasers, for example, are generally in the form of a tube consisting for instance of "Pyrex" or quartz, and, if the gas is to be excited or pumped by means of a potential applied between two electrodes, the tube will incorporate an electrode at each of its ends. These electrodes are generally placed in bulbs, of which the internal diameter is larger than that of the internal diameter of the laser tube proper. Each such bulb can be disposed on the side of the tube so as not to obstruct or otherwise interfere with the laser beam, this solution being generally employed in the case of tubes of relatively small length. Where the tube is of a length of the order of one meter or more, each bulb may form an extension of the tube, but then the geometrical shape of the electrodes must permit the passage of the laser beam. Moreover, it is necessary to discover, for the Brewster angle window placed at the end of the laser tube and mounted fast with the base of say the anode, the correct angular disposition with respect to the other Brewster angle window at the cathode end of the tube.

SUMMARY OF THE INVENTION

According to the present invention there is provided an anode for a gas tube including an annular metal base defining therein, first and second passages. Two metal tubes project from the base and lead from the first and second passages respectively. An annular active anode part defining therein a third passage is supported by the tubes which both open into the third passage. Said first and second passages are connected to a coolant circulatory supply whereby coolant may be supplied to said annular part through the two tubes acting respectively as supply and return conduits.

DESCRIPTION OF PREFERRED EMBODIMENTS

Figure 2:
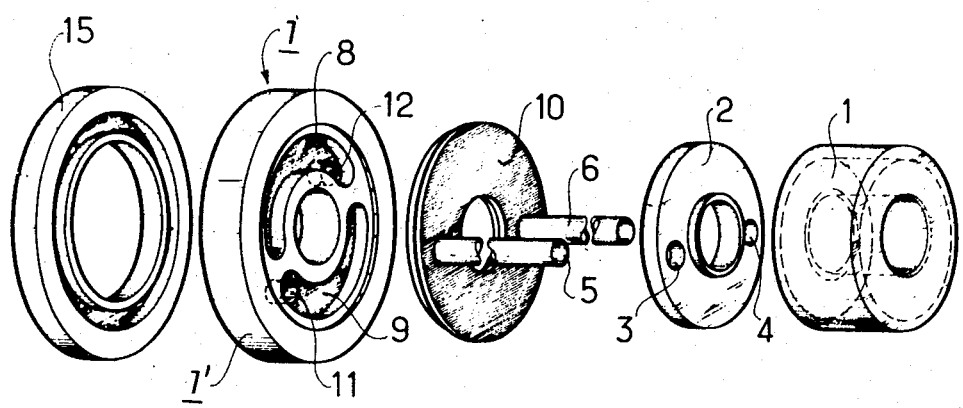
FIG. 2 is an exploded view of the same anode.
Figure 1:
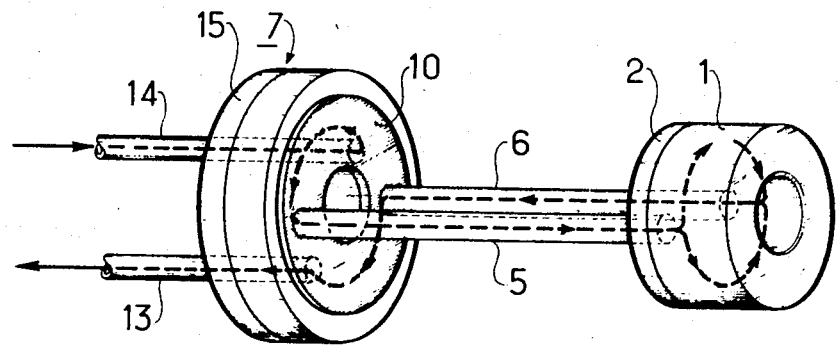
FIG. 1 is a perspective view of an assembled anode of the invention, showing the cooling circuit incorporated therein.

As shown in FIGS. 1 and 2, the anode comprises a hollow, double-walled annular part 1 which consists of an annulus of U-shaped cross-section, to define, in conjunction with a cover 2 which closes the U, a passage. The cover has two openings 3 and 4 in which are fitted metal tubes 5 and 6, respectively opening into the aforesaid passage. The electrode also comprises an annular base 7 which consists of an annular body 7' in which is formed two grooves 8 and 9 constituting two further passages, and of a cover 10.

The tubes 5 and 6 lead from the grooves 8 and 9 towards the annular part 1 and extend in a fluid-tight manner through the cover 10. The position of the tubes 5 and 6 in relation to the grooves 8 and 9 is that each tube is close to one end of its respective groove.

The body 7' is also provided with two drilled holes 11 and 12, opening into the grooves 8 and 9 respectively, and into these holes project two further tubes 13 and 14. Each of the latter tubes is disposed at the end of its associated groove opposite the end where the tube 4 or 5 is disposed.

The parts 1, 2, 6, 5, 7' and 10 are made of metals which are resistant to an electric arc and are generally used for the manufacture of gas tube anodes and more particularly laser tube anodes. The tubes 13 and 14 may be made of metal, but they are preferably of an insulating material.

The tubes 13 and 14 represent a connection of the passages formed by the grooves 8 and 9 to a coolant circulatory supply (not shown) and, in operation, as indicated by the arrows in FIG. 2, the cooling or refrigerating fluid enters through the tube 14 and passes through the passage defined by the groove 8, from which it flows into and through the tube 5 to flow into and cool the annular part 1. The return is through the tube 6, the passage defined by the groove 9 and the tube 13.

The body 7' is mounted on a support ring 15, which is fixed either directly to the glass wall of the laser tube or to a metal ring fast with the laser tube wall.

The electrical connections can be effected in any known manner, either by means of the ring 15, or by a special conductor, or even by means of the tubes 13–14 when these latter are made of metal.

Figure 3:
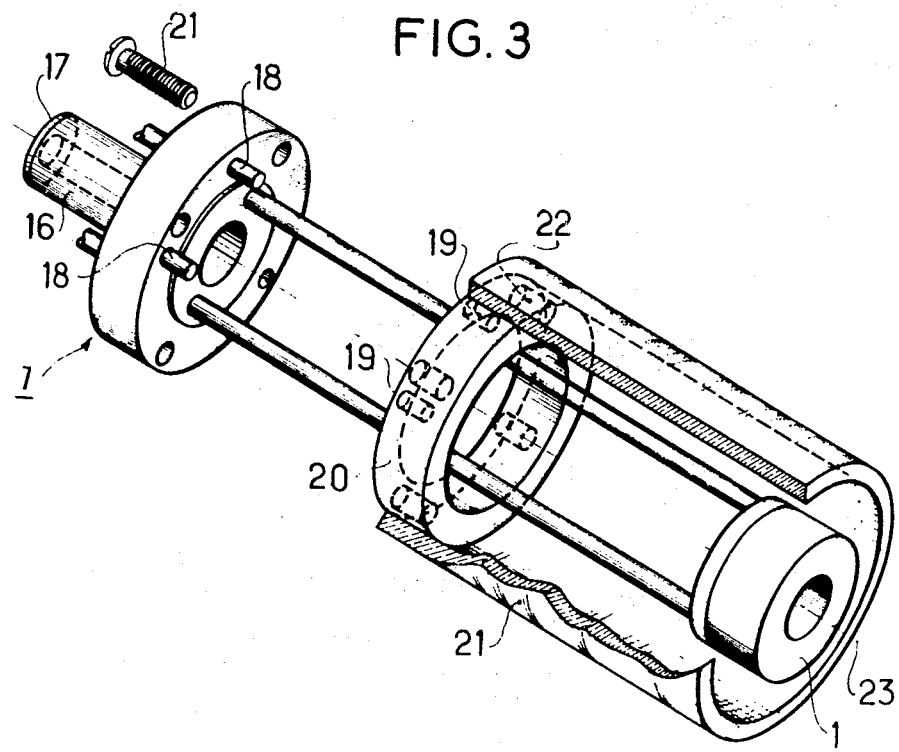
FIG. 3 is an exploded perspective view of the various elements of an alternative anode structure of the invention.

Referring now to FIG. 3, the coaxial structure of the anode permits the arrangement, along the axis of symmetry 23 of the structure, of a laser tube mouth 16 closed by a plate 17 disposed at the Brewster angle.

The base 7 of the anode, in this embodiment, carries two studs 18 adapted to be received by recesses 19 formed in a ring 20 fixed to the laser tube 21, of which only a part has been shown. The base 7 and the ring 20 may be made of copper and the connection between the quartz laser tube and the ring 20 can be provided by a metal sleeve made of a ferro-nickel which is known under the name of "Kovar."

For locating the angular position of the Brewster plate 17 in realtion to the tube axis, the two studs are disposed in positions which are not in diametric alignment to the base 7.

The base 7 is secured to the ring 20 by a series of bolts 21 (only one of which is shown), adapted to be screwed into tapped holes 22 in the ring 20. The laser tube is made gas-tight by a toroidal joint held between the ring 20 and the base 7.

This anode structure is capable of being mounted on the end of the laser tube in only one angular disposition in relation to the tube axis and facilitates any dismantling, for example for cleaning purposes or replacement of parts, which may be required, and subsequent re-assembly. It provides the advantage of an immediate stimulated emission, without interference with the adjustment of the associated resonance cavity and particularly of the Brewster angle plates.

Figure 4:
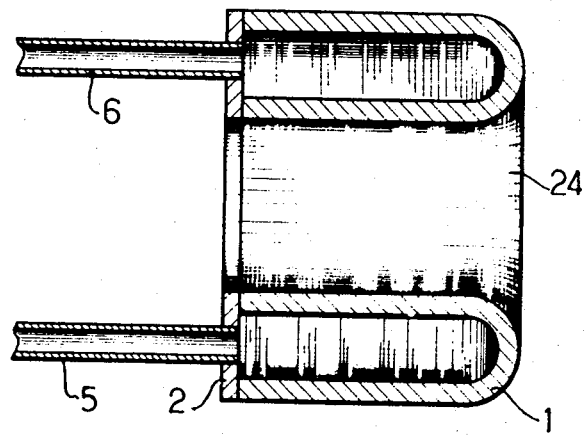
FIG. 4 is a sectional view showing the active anode part of an anode structure of the invention.

FIG. 4 represents the active part 1 of the anode, from which it will be seen that the end 24 of the part 1 is advantageously rounded in order to avoid point effects during electric discharge in the laser tube. This end has the form of a half-annulus, sectioned along the plane of revolution.

In order to improve output and to reduce further the risk of point effects, the external rounded surface of the end 24 in contact with the electric arc is polished. The rounding of this portion also makes it possible to have a lower electric density per unit of surface and consequently a longer effective life for the anode.

What is claimed is:

1. An anode for a gas tube comprising: an annular metal base defining therein first and second cooling passages, two metal tubes projecting from the base and leading from the first and second passages respectively, an annular active anode part defining therein a third passage and supported by the tubes which both open into the third passage and means for connecting said first and second passages to a coolant circulatory supply whereby coolant may be supplied to said annular part through the two tubes acting respectively as supply and return conduits.

2. The anode as claimed in claim 1 wherein: the active anode part comprises a double walled annular element of U-shaped cross-section and a cover closing the open end of the element.

3. The anode as claimed in claim 2; wherein the portion of the annular element corresponding to the base of the U is rounded.

4. The anode as claimed in claim 2, in which the tubes are connected to the cover.

5. The anode as claimed in claim 3, wherein the rounded position is polished.

6. The anode as claimed in claim 1, wherein the base further comprises; an annular member defining two grooves and a cover closing the two grooves such that the grooves in conjunction with the cover define the two cooling passages.

7. The anode as claimed in claim 6 for use in a laser tube further comprising: a further tube extending axially from the base, a plate mounted on the free end of the tube and inclined relatively to the axis of the base by an angle equal to the Brewster angle.

8. The anode as claimed in claim 7 further comprising: angular position locating means carried by the base adapted to cooperate with the end of the laser tube for defining the angular orientation of the base relative to the axis of the laser tube and in turn that of the Brewster angle plate.

9. The anode as claimed in claim 8, wherein the locating means are formed by at least one projecting part on the base and adapted to cooperate with a seating formed in the end of the laser tube.

10. The anode as claimed in claim 9, wherein a plurality of projecting parts are provided, said projecting parts being distributed asymmetrically with respect to the axis of the base.

No reference cited

RAYMOND F. HOSSFELD, Primary Examiner

C. R. CAMPBELL, Assistant Examiner

U.S. Cl. X.R.

313—217; 331—94.5